United States Patent
Ma

(10) Patent No.: US 7,231,534 B2
(45) Date of Patent: *Jun. 12, 2007

(54) METHOD AND APPARATUS FOR IMPROVING BUS MASTER PERFORMANCE

(75) Inventor: Kenneth Ma, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/189,688

(22) Filed: Jul. 26, 2005

(65) Prior Publication Data

US 2005/0262366 A1 Nov. 24, 2005

Related U.S. Application Data

(63) Continuation of application No. 10/339,843, filed on Jan. 10, 2003, now Pat. No. 6,971,033.

(51) Int. Cl.
*G06F 1/26* (2006.01)

(52) U.S. Cl. ............... 713/323; 713/300; 713/310; 713/320; 713/321; 713/322; 713/324; 713/330; 713/340

(58) Field of Classification Search ............... None
See application file for complete search history.

(56) References Cited

U.S. PATENT DOCUMENTS

| | | | | |
|---|---|---|---|---|
| 6,125,450 A | * | 9/2000 | Kardach | 713/323 |
| 6,446,215 B1 | * | 9/2002 | Meyer et al. | 713/310 |
| 6,560,712 B1 | * | 5/2003 | Arends et al. | 713/320 |
| 6,971,033 B2 | * | 11/2005 | Ma | 713/300 |
| 6,976,132 B2 | * | 12/2005 | Dieffenderfer et al. | 711/146 |
| 6,981,081 B2 | * | 12/2005 | Stevens et al. | 710/113 |
| 7,028,200 B2 | * | 4/2006 | Ma | 713/324 |

* cited by examiner

*Primary Examiner*—A. Elamin
(74) *Attorney, Agent, or Firm*—McAndrews, Held & Malloy, Ltd.

(57) ABSTRACT

A method and apparatus are disclosed for performing dynamic arbitration of memory accesses by a CPU and at least one bus master interface module based on, at least in part, monitoring a CPU throttle control signal and monitoring CPU power and performance states, and making decisions based on the monitored parameters. Bus master memory access break events and memory read and write accesses are also monitored as part of the arbitration process in accordance with certain embodiments of the present invention. An arbitration (ARB) module performs the dynamic arbitration. A CPU throttle control module generates the CPU throttle control signal, indicating when the CPU is idle, and also monitors and outputs the CPU power and performance states. A memory controller (MC) module controls accesses to the memory subsystem based on, at least in part, the dynamic arbitration performed by the dynamic arbitration module.

23 Claims, 6 Drawing Sheets

METHOD AND APPARATUS FOR IMPROVING BUS MASTER PERFORMANCE

RELATED APPLICATIONS

This application is a continuation of U.S. patent application Ser. No. 10/339,843, entitled "Method and Apparatus for Improving Bus Master Performance," filed on Jan. 10, 2003, now U.S. Pat. No. 6,971,033. The present application hereby incorporates by reference herein application Ser. No. 10/146,554, filed on May 15, 2002, now U.S. Pat. No. 7,010,708, in its entirety. The present application hereby incorporates by reference herein application Ser. No. 10/163,746, filed on Jun. 5, 2002, now U.S. Pat. No. 7,028,200, in its entirety.

BACKGROUND OF THE INVENTION

Advanced CPU's and embedded processors are achieving higher performance as time goes on. However, memory subsystems are requiring lower latency and more bandwidth to sustain performance. Dynamic random access memory (DRAM), for example, is getting faster in clock speed, wider in bus size, and larger in capacity. CPU and bus master I/O devices are competing for access to the memory subsystems, in terms of both latency and bandwidth, to perform read and write operations.

A CPU is the computing and control hardware element of a computer-based system. In a personal computer, for example, the CPU is usually an integrated part of a single, extremely powerful microprocessor. An operating system is the software responsible for allocating system resources including memory, processor time, disk space, and peripheral devices such as printers, modems, and monitors. All applications use the operating system to gain access to the resources as necessary. The operating system is the first program loaded into the computer as it boots up, and it remains in memory throughout the computing session.

Typical PC systems use either 64-bit or 128-bit DRAM memory subsystems. In the latter case, the memory subsystem is usually organized as two independent sections so as to be controlled by two 64-bit memory controllers (MC). A typical 64-bit memory controller (MC) may support between two and four SDRAM dual in-line memory modules (DIMM) that make up the memory subsystem. Each DIMM has up to two memory rows (each side of a double-sided DIMM is called a memory row), and each memory row may have multiple internal memory banks. Each bank comprises multiple memory pages, one page from each DRAM chip of the memory row.

An operating system keeps track of the percentage of time that the CPU is idle and writes the idle percentage value to a register. For example, the CPU may have been idle for about 40% of a last predefined time period. Different operating systems use different windows of time to compute the idle percentage value. Older operating systems have longer idle loops. Newer operating systems have shorter idle loops in order to accommodate as many tasks as possible running simultaneously.

In most systems, the performance of the processor may be altered through a defined "throttling" process and through transitions into multiple CPU performance states. Throttling is a type of forced power management. The CPU may be put to sleep for short periods of time even when the system is highly active. Throttling helps manage power consumption of the CPU.

Certain CPU power management schemes are known which use statistical methods to monitor CPU host interface (sometimes known as Front-Side Bus) activities to determine average CPU percent utilization and set the CPU throttling accordingly. However, advanced CPUs incorporate large cache memory that hide greater than 90% of the CPU activities within the CPU core. Therefore, the FSB percent utilization has little correlation to the actual core CPU percent utilization. As a result, prior implementations cannot correctly predict idle states of CPUs with super-pipelined architectures and integrated caches. Cache is a section of very fast memory (often static RAM) reserved for the temporary storage of the data or instructions likely to be needed next by the processor.

High performance I/O devices often employ bus-mastering mechanisms to minimize CPU overhead. A bus master is a device within a CPU-based and memory-based system that may access the memory without using the CPU. If it is not known, in a most effective way, when the CPU may be powered down, then it is not known when the CPU may issue any additional read/write accesses to memory. Therefore, other bus master I/O devices may not have as timely access as possible to the memory subsystem.

FIG. 1 shows a typical, simple round robin (RR) arbiter. In such an arbiter, the next memory access passes to the next device in the arbitration chain (e.g., CPU to AGP graphics device to southbridge (SBR) device to CPU).

In practice, CPU's tend to be latency-sensitive while I/O devices tend to be bandwidth-sensitive. As a result, typical arbitration algorithms have been designed to grant CPU accesses to memory with the shortest possible latency while ensuring sufficient bandwidth for I/O devices. Depending on the operating system and application environments, a weighted round robin (WRR) arbiter is often used (see FIG. 2). The weight (priority) of the CPU and, for example, an AGP graphics device can be programmed through a register setting to balance the memory latency and bandwidth between, for example, the CPU, the AGP graphics device, and a southbridge (SBR) device. A next access is based, in part, on the weighting (priority) given to the CPU and the AGP graphics device.

It is desirable to improve bus master performance of memory accesses without degrading CPU performance.

Further limitations and disadvantages of conventional and traditional approaches will become apparent to one of skill in the art, through comparison of such systems with embodiments of the present invention as set forth in the remainder of the present application with reference to the drawings.

BRIEF SUMMARY OF THE INVENTION

Certain embodiments of the present invention provide a method and apparatus for performing memory access arbitration in a system employing a CPU, a memory subsystem, and bus master devices. In particular, certain embodiments provide for arbitrating memory accesses between a CPU, and at least one of a graphics interface module, a southbridge interface module, and some other bus master interface device.

A method of the present invention provides for performing dynamic arbitration of memory accesses by a CPU and at least one bus master interface module based on, at least in part, monitoring a CPU throttle control signal and monitoring CPU power and performance states, and making decisions based on the monitorings. Bus master memory access break events and memory read and write accesses are also monitored as part of the arbitration process in accordance with certain embodiments of the present invention.

Apparatus of the present invention provides an arbitration (ARB) module to perform dynamic arbitration of memory accesses by a CPU and at least one bus master interface module within a system employing a CPU, a memory subsystem, and at least one bus master interface module. A CPU throttle control module generates a CPU throttle control signal, indicating when the CPU is idle, and also outputs CPU power and performance states. A memory controller (MC) module controls accesses to the memory subsystem based on, at least in part, the dynamic arbitration performed by the dynamic arbitration module.

These and other advantages and novel features of the present invention, as well as details of an illustrated embodiment thereof, will be more fully understood from the following description and drawings.

DETAILED DESCRIPTION OF THE INVENTION

Figure 1:
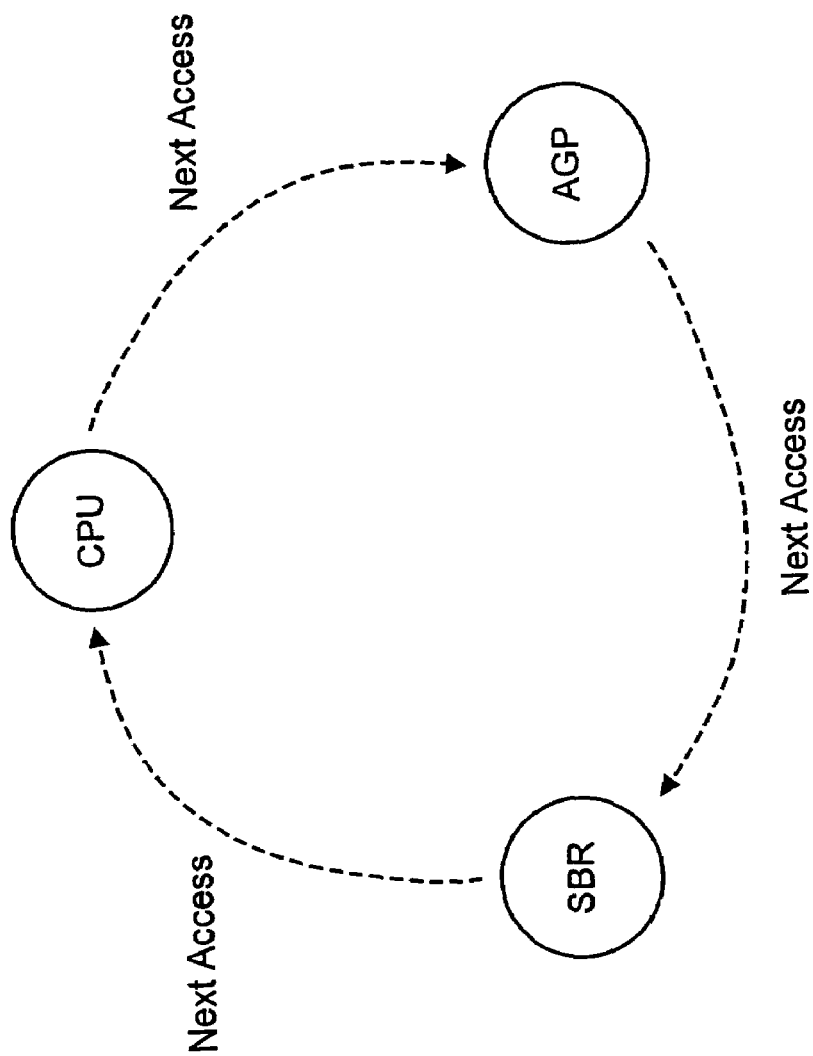
FIG. 1 is a diagram illustrating a simple round robin (RR) arbitration process.
Figure 2:
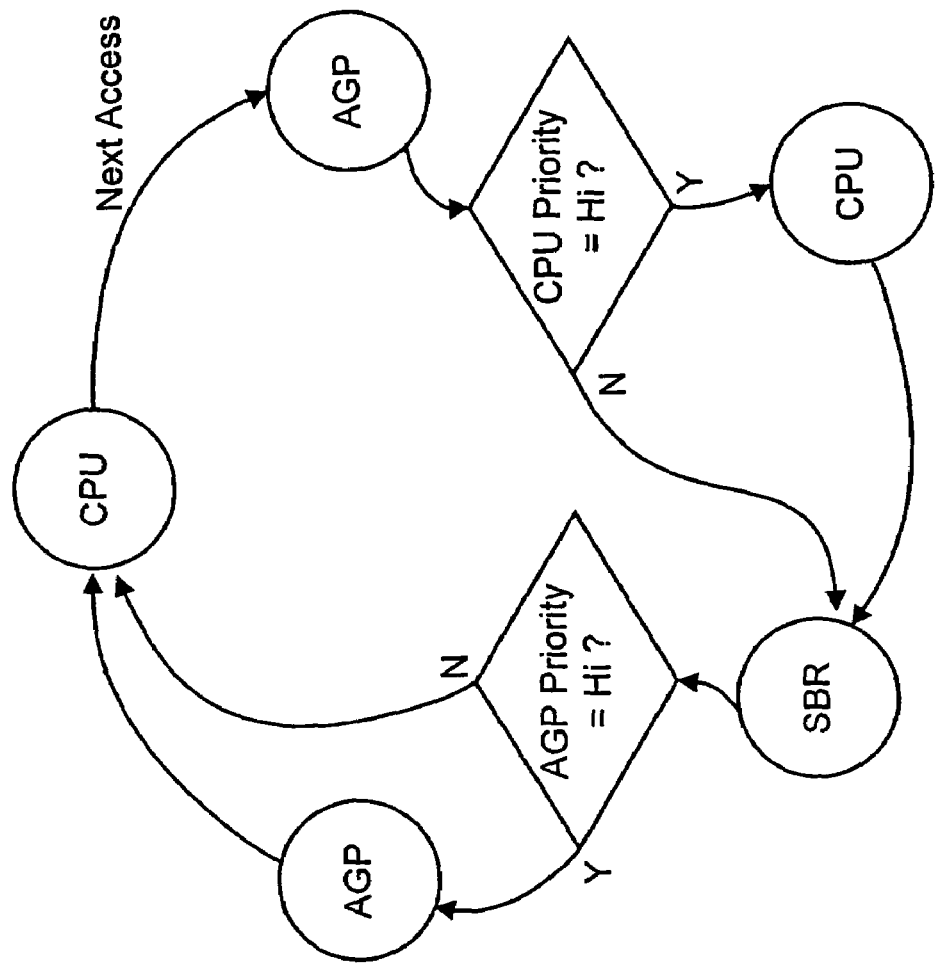
FIG. 2 is a diagram illustrating a weighted round robin (WRR) arbitration process.
Figure 3:
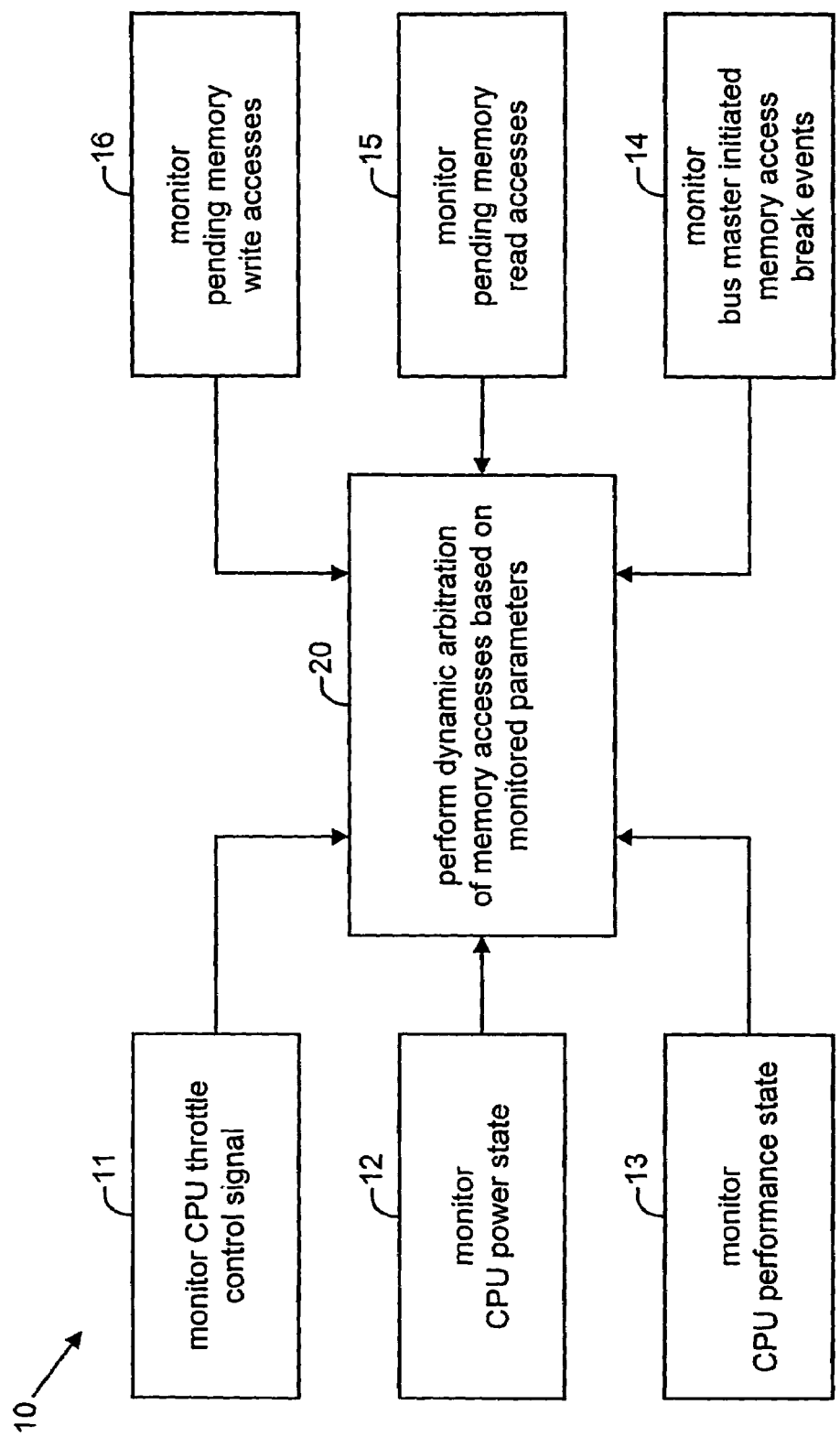
FIG. 3 is an illustration of a method for performing dynamic arbitration of memory accesses in accordance with an embodiment of the present invention.

FIG. 3 illustrates a method 10 for performing dynamic arbitration of memory accesses between a CPU and other devices within a CPU-based and memory-based system, in accordance with an embodiment of the present invention. Steps 11–16 are performed simultaneously (i.e., the various monitored parameters are monitored at the same time). In step 11, a CPU throttle control signal is monitored. In step 12, a CPU power state is monitored. In step 13, a CPU performance state is monitored.

In step 14, bus master initiated memory access break events are monitored. In step 15, pending memory read accesses are monitored. In step 16, pending memory write accesses are monitored. In step 20, the various monitored parameters are used to perform dynamic arbitration of memory accesses. In other words, based on the states of the monitored parameters, the next memory accesses are determined.

In accordance with alternative embodiments of the present invention, any subset of the various previously described parameters may be monitored and used to perform the dynamic arbitration. Also, it is possible to add "predictors" to predict upcoming memory accesses for CPU and graphics. Such predictors already exist in some core logic chipsets and may be monitored, in accordance with an embodiment of the present invention, and used to help perform the dynamic arbitration.

Figure 4:
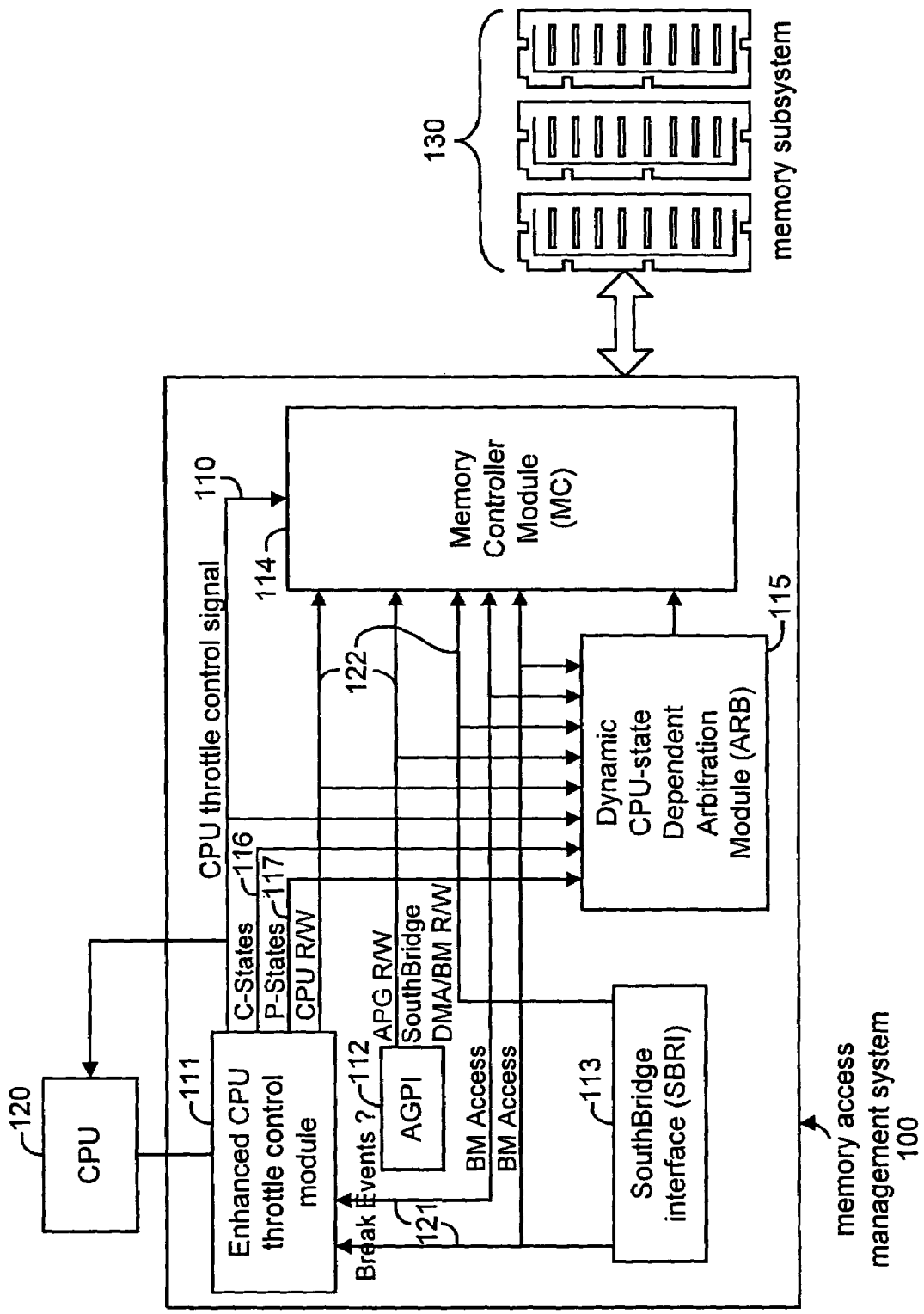
FIG. 4 is a schematic block diagram of a system employing dynamic arbitration between a CPU, an AGP graphics interface, and a southbridge (SBR) interface using the method of FIG. 3 in accordance with an embodiment of the present invention.

FIG. 4 is a schematic block diagram of a memory access management system 100 interfacing to a CPU 120 and a memory subsystem 130 in accordance with an embodiment of the present invention. In an embodiment of the present invention, the memory subsystem 130 comprises at least one Memory DIMM module. The Memory DIMM module may comprise, for example, SDRAM, DDR, DDR-II or future types of memory, in accordance with an embodiment of the present invention. Memory access management system 100 includes an enhanced CPU throttle control (ECTC) module 111, an accelerated graphics port interface (AGPI) module 112, a southbridge interface (SBRI) module 113, a memory controller (MC) module 114, and a dynamic CPU-state dependent arbitration (ARB) module 115.

Other embodiments of the present invention may not include an AGPI module or a SBRI module but may instead include other interfaces that interface to other devices (e.g., other bus master devices).

In accordance with an embodiment of the present invention, the MC module 114 includes a read/write buffer controller (FIFO) module (not shown) and a DRAM controller (DRC) module (not shown) (see application 13737US01 incorporated herein by reference).

Figure 5:
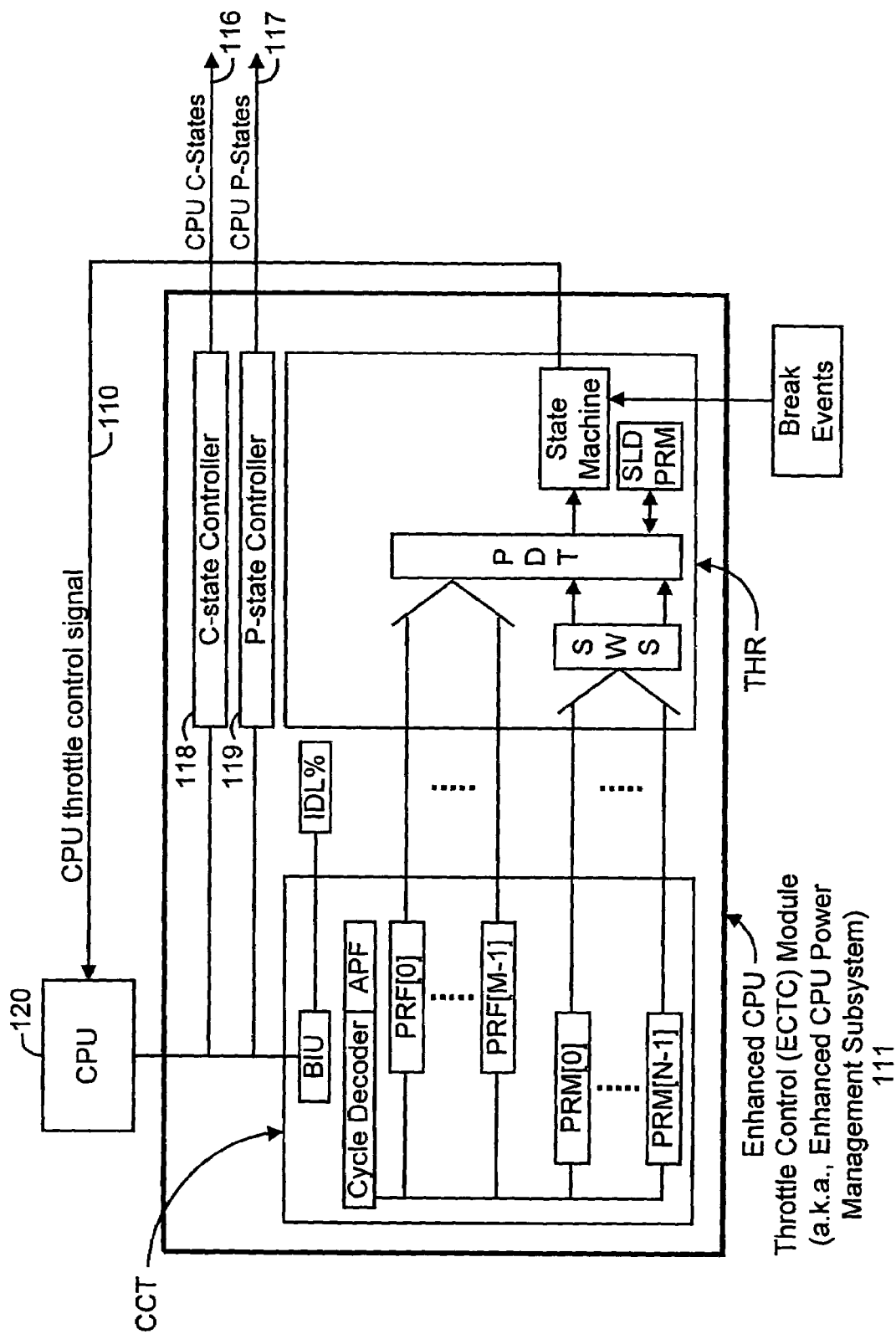
FIG. 5 is a schematic block diagram of an enhanced CPU throttle control module (a.k.a., enhanced CPU power management subsystem) used in the system of FIG. 4 in accordance with an embodiment of the present invention.

The Enhanced CPU Throttle Control (ECTC) Module 111 performs CPU profiling, collects statistics of CPU performance, and performs intelligent predictions to generate an adaptive CPU throttle control signal 110 to control the throttling of the CPU 120. The ECTC module 111 controls the throttling of the CPU 120 on a time segment by time segment basis and communicates to the MC module 114 and the ARB module 115 when the CPU 120 is idle and whether there are any pending CPU memory accesses. FIG. 5 is a schematic block diagram of an ECTC module 111 interfacing to a CPU 120 in accordance with an embodiment of the present invention (see, for example, application Ser. No. 10/146,554, incorporated herein by reference, for additional details with respect to the similarly configured CPU power management subsystem).

In an embodiment of the present invention, the CPU throttle control signal 110 comprises a CPU stop clock signal that is fed back to a STPCLK# signal input of the CPU 120. The CPU stop clock signal may be a digital logic high during a portion of a run-time segment and a digital logic low during another portion of the run-time segment. When the CPU stop clock signal is a logic high, the CPU begins processing and when the CPU stop clock signal is a logic low, the CPU stops processing in accordance with an embodiment of the present invention.

As a result, the duty cycle of the CPU stop clock signal 110 controls the throttling of the CPU 120 on a time segment by time segment basis. The duty cycle of the CPU stop clock signal 110 is adjusted for each run-time segment based on the most recently computed CPU throttle percentage value and CPU percent idle value for the last run-time segment (see, for example, application Ser. No. 10/146,554, incorporated herein by reference).

In accordance with an embodiment of the present invention, the CPU throttle control signal 110 is generated by the ECTC module 111 based on CPU performance of known code segments run during boot time of the CPU, key processing performance parameters corresponding to predefined run-time segments of the CPU, a CPU percent idle value, a CPU time stamp, and statistically predicting how to throttle the CPU on a time segment by time segment basis (see, for example, application Ser. No. 10/146,554 for more details).

The ECTC module 111 also includes a C-state controller 118 that monitors and outputs a CPU power state 16 of the CPU 120. The ECTC module 111 also includes a P-state controller 119 that monitors and outputs a CPU performance state 117 of the CPU 120. The CPU power state 116 and CPU performance state 117 are input to the dynamic CPU-state dependent arbitration (ARB) module 115 in accordance with an embodiment of the present invention (see, for example, FIG. 4).

Microsoft et al. published the ACPI (Advanced Configuration Power Interface) power management specification that is intended to provide a standardized, operating system-independent and platform-independent power management mechanism to enable the OSPM (operating system-directed power management) initiative. An ACPI-compatible operating system may balance CPU performance versus power consumption and thermal states by manipulating the processor performance controls. OSPM is very effective for peripheral device power management, such as for UARTs or modems, since OSPM knows whether the port is opened or the modem is in use.

Certain embodiments of the present invention are transparent to other power management protocols and are compatible with ACPI and OSPM. Certain embodiments of the present invention are independent of the operating system and CPU.

The ACPI specification defines four CPU power states (C0, C1, C2, and C3). When the CPU 120 is in the C0 power state, the CPU 120 executes instructions. The C1, C2, and C3 power states are sleep states of the CPU (non-executing power states). The CPU may be put into the sleep states to save power consumption by the CPU.

The C1 power state has the lowest latency. The hardware latency must be low enough such that the operating software does not consider the latency aspect of the state when deciding whether or not to use it. Aside from putting the processor in a non-executing power state, there are no other software-visible effects.

The C2 state offers improved power savings over the C1 state. The worst-case hardware latency is provided by way of the ACPI system firmware and the operating software may use the information to determine when the C1 state should be used instead of the C2 state. Aside from putting the processor in a non-executing power state, there are no other software-visible effects.

The C3 state offers improved power savings over the C1 and C2 states. The worst-case hardware latency is provided by way of the ACPI system firmware and the operating software may use the information to determine when the C2 state should be used instead of the C3 state. While in the C3 state, the processor's caches maintain state but ignore any snoops. The operating software is responsible for ensuring that the caches maintain coherency.

The ACPI specification defines certain CPU performance states (P0, P1, . . . , Pn). In different performance states, the CPU may operate at different processor frequencies and voltage scaling levels. When the CPU 120 is in the P0 performance state, the CPU uses its maximum performance capability and may consume maximum power. In the P1 performance state, the performance capability of the CPU is limited below its maximum and consumes less than maximum power. In the Pn performance state, the performance capability of the CPU is at its minimum level and consumes minimal power while remaining in an active state. State n is a maximum number and is CPU dependent. CPU's may define support for any number of performance states that don't exceed sixteen.

In an embodiment of the present invention, AGPI module 112 interfaces between an AGP graphics device and MC module 114. The AGPI module 112 generates break events and bus master accesses to inform the ECTC module 111, the MC module 114, and the ARB module 115 that bus master devices need servicing. A bus master directs traffic on a computer bus or I/O paths. The bus master is the "master" and the target device being accessed is the "slave". The bus master controls the bus paths on which the address and control signals flow. In other embodiments of the present invention, the AGPI module may instead be, for example, another bus master interface module interfacing between the MC module 114 and, for example, a PCI device, a PCI express device, or a 3GIO device.

In an embodiment of the present invention, SBRI module 113 interfaces between Southbridge/Bus Master/DMA devices and the MC module 114. The SBRI module 113 generates break events and bus master accesses to inform the ECTC module 111, the MC module 114, and the ARB module 115 that bus master devices need servicing. A Southbridge is a chipset that manages the basic forms of input/output (I/O) such as Universal Serial Bus (USB), serial, audio, integrated drive electronics (IDE), and PCI bus in a computer-based system. Direct Memory Access (DMA) is a capability provided by some computer bus architectures that allows data to be sent directly from an attached device (e.g. a disk drive) to the memory subsystem 130. The CPU 120 is freed from involvement with the data transfer.

Other embodiments of the present invention are not restricted to northbridge/southbridge architectures, however.

As described earlier, the memory access management system 100 monitors various system parameters, as shown in the method 10, including the CPU throttle control signal 110, the CPU power state 116, the CPU performance state 117, bus master initiated memory access break events 121, and pending memory read/write accesses 122 (see FIG. 4). The monitored parameters are input to MC module 114 and ARB module 115. ARB module 115 performs dynamic arbitration of memory accesses to memory subsystem 130 by the CPU, AGPI, SBRI, or other bus master devices based on at least a subset of the monitored parameters. ARB module 115 also interfaces to MC module 114 to direct MC module 114 to perform memory accesses to memory subsystem 130 according to an arbitration scheme of an embodiment of the present invention.

Figure 6:
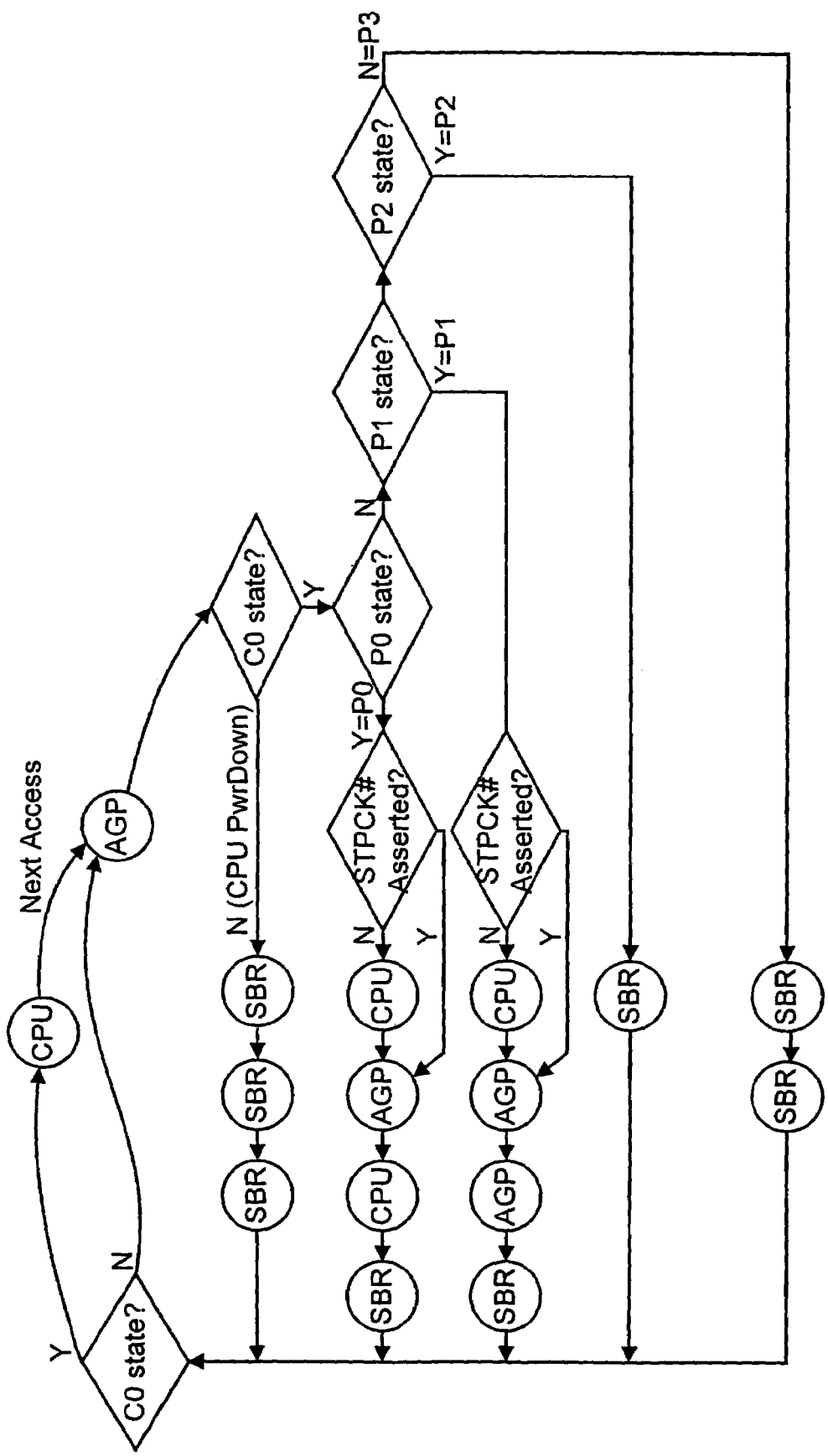
FIG. 6 is a diagram illustrating dynamic memory access arbitration schemes in accordance with an embodiment of the present invention.

FIG. 6 is an example diagram illustrating dynamic memory access arbitration schemes performed by the ARB module 1115 in accordance with an embodiment of the present invention. If the CPU 120 is in the C0/P0 states, the ARB module 115 defines the memory access arbitration scheme as CPU-AGPI-CPU-AGPI-CPU-SBRI (3:2:1) in accordance with an embodiment of the present invention. In other words, the ARB module 115 provides more weight (priority) to the CPU 120 to allow more CPU intensive operations and, therefore, memory accesses. The CPU 120 is given priority 3 times as often as the SBRI 113, and the AGPI 112 is given priority twice as often as the SBRI 113.

If the CPU 120 is in the C0/P1 states, the ARB module 115 defines the memory access arbitration scheme as CPU-AGPI-CPU-AGPI-AGPI-SBRI (2:3:1). The ARB module 115 provides more weight to AGP graphics since the C0/P1 state combination does not depend as much on the CPU 120.

If the CPU 120 is in the C0/P2 states, the ARB module 115 defines the memory access arbitration scheme as CPU- AGPI-SBRI (1:1:1). The ARB module 115 provides equal weight, effectively allowing more I/O intensive operations.

If the CPU 120 is in the C0/P3 states, the ARB module 115 defines the memory access arbitration scheme as CPU-AGPI-SBRI-SBRI (1:1:2). The CPU 120 cannot transfer enough 3D data construct in the C0/P3 states combination and, therefore, the ARB module 115 provides the heaviest weight for SBR and bus master I/O devices.

When the CPU 120 is not in the C0 state (i.e., in C1, C2, or C3 state), the ARB module 115 defines the memory access arbitration scheme as AGPI-SBRI-SBRI-SBRI (0:1: 3). The CPU 120 will not generate any more CPU memory accesses in the C1, C2, or C3 states and, therefore, the ARB module 115 only arbitrates between the AGPI 112 and SBRI 1113. The (0:1:3) weighting assumes SBR bus mastering operations need more weight than AGP graphics.

Other embodiments of the present invention may provide other arbitration and weighting schemes based on the various combinations of CPU power states and CPU performance states. Also, other embodiments of the present invention may adjust the weighting schemes based on other parameters such as the CPU throttle control signal 110, bus master initiated memory access break events 121, and pending memory subsystem read and write accesses 122.

The various elements of memory access management system 100 may be combined or separated according to various embodiments of the present invention. For example, the ARB module 115 may be integrated into the MC 114. Also, the AGPI module 112 and SBRI module 113 may be combined into a single module.

Also, the various modules may be implemented as various combinations of software and/or hardware modules. For example, the ARB module 115 may be a software module running on a dedicated processor in accordance with an embodiment of the present invention.

In summary, certain embodiments of the present invention afford an approach to perform dynamic arbitration of memory accesses by a CPU and at least one bus master interface module based on, at least in part, monitoring a CPU throttle control signal and monitoring CPU power and performance states, and making memory access decisions based on the monitored parameters.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In an electrical system comprising a memory subsystem, a CPU and other components, a method for managing memory access, the method comprising:
    monitoring CPU throttling;
    monitoring CPU sleep state operation; and
    arbitrating access to the memory subsystem by the CPU and at least one of the other components based, at least in part, on the monitored CPU throttling and the monitored CPU sleep state operation.

2. The method of claim 1, wherein said at least one of the other components comprises a bus master interface module.

3. The method of claim 1, wherein monitoring CPU throttling comprises monitoring a control signal that throttles the CPU.

4. The method of claim 1, wherein monitoring CPU sleep state operation comprises monitoring whether the CPU is operating at full power or in any of a plurality of sleep states.

5. The method of claim 1, wherein monitoring CPU sleep state operation comprises monitoring ACPI-defined CPU power states.

6. In an electrical system comprising a memory subsystem, a CPU and other components, a method for managing memory access, the method comprising:
    monitoring CPU throttling;
    monitoring CPU performance level; and
    arbitrating access to the memory subsystem by the CPU and at least one of the other components based, at least in part, on the monitored CPU throttling and the monitored CPU performance level.

7. The method of claim 6, wherein said at least one of the other components comprises a bus master interface module.

8. The method of claim 6, wherein monitoring CPU throttling comprises monitoring a control signal that throttles the CPU.

9. The method of claim 6, wherein monitoring CPU performance level comprises monitoring at least one of: processor frequency and voltage scaling level.

10. The method of claim 6, wherein monitoring CPU performance level comprises monitoring ACPI-defined CPU performance states.

11. In an electrical system comprising a memory subsystem, a CPU and other components, a method for managing memory access, the method comprising:
    monitoring CPU sleep state operation;
    monitoring CPU performance level; and
    arbitrating access to the memory subsystem by the CPU and at least one of the other components based, at least in part, on the monitored CPU sleep state operation and the monitored CPU performance level.

12. The method of claim 11, wherein said at least one of the other components comprises a bus master interface module.

13. The method of claim 11, wherein monitoring CPU sleep state operation comprises monitoring whether the CPU is operating at full power or in any of a plurality of sleep states.

14. The method of claim 11, wherein monitoring CPU performance level comprises monitoring at least one of: processor frequency and voltage scaling level.

15. In an electrical system comprising a memory subsystem, a CPU and other components, at least one module adapted to:
    monitor CPU throttling;
    monitor CPU performance level; and
    arbitrate access to the memory subsystem by the CPU and at least one of the other components based, at least in part, on the monitored CPU throttling and the monitored CPU performance level.

16. The system of claim 15, wherein said at least one of the other components comprises a bus master interface module.

17. The system of claim 15, wherein said at least one of the other components comprises a graphics interface module.

18. The system of claim 15, wherein said at least one of the other components comprises a southbridge interface module.

19. The system of claim 15, wherein said at least one module comprises an arbitration module.

20. The system of claim 15, wherein said at least one module comprises a memory controller module adapted to control access to the memory subsystem in accordance with the access arbitration.

21. The system of claim 15, wherein said at least one module is adapted to monitor CPU throttling by, at least in part, monitoring a control signal that throttles the CPU.

22. The system of claim 15, wherein said at least one module is adapted to monitor CPU performance level by, at least in part, monitoring at least one of:

processor frequency and voltage scaling level.

23. The system of claim 15, wherein said at least one module is adapted to monitor CPU performance level by, at least in part, monitoring ACPI-defined CPU performance states.

* * * * *